(12) United States Patent
Azadet et al.

(10) Patent No.: US 7,685,640 B2
(45) Date of Patent: Mar. 23, 2010

(54) METHODS AND APPARATUS FOR INTERFACE ADAPTER INTEGRATED VIRUS PROTECTION

(75) Inventors: Kameran Azadet, Morganville, NJ (US); Anil Mudichintala, Morganville, NJ (US); Fadi Saibi, Red Bank, NJ (US)

(73) Assignee: Agere Systems Inc., Allentown, PA (US)

( * ) Notice: Subject to any disclaimer, the term of this patent is extended or adjusted under 35 U.S.C. 154(b) by 1583 days.

(21) Appl. No.: 10/945,663

(22) Filed: Sep. 21, 2004

(65) Prior Publication Data
US 2006/0064755 A1  Mar. 23, 2006

(51) Int. Cl.
*G06F 7/04* (2006.01)
(52) U.S. Cl. .............................. 726/24; 726/22; 726/23
(58) Field of Classification Search .................. 713/192; 726/22–24
See application file for complete search history.

(56) References Cited

U.S. PATENT DOCUMENTS

| | | | | |
|---|---|---|---|---|
| 6,330,590 | B1* | 12/2001 | Cotten | 709/206 |
| 6,701,440 | B1* | 3/2004 | Kim et al. | 726/24 |
| 7,409,717 | B1* | 8/2008 | Szor | 726/24 |
| 2002/0095607 | A1* | 7/2002 | Lin-Hendel | 713/201 |
| 2003/0101381 | A1* | 5/2003 | Mateev et al. | 714/38 |
| 2003/0126468 | A1* | 7/2003 | Markham | 713/201 |
| 2008/0276102 | A1* | 11/2008 | MacKay et al. | 713/193 |

OTHER PUBLICATIONS

Tanenbaum, Anders, "Modern Operating Systems", 2nd Ed. Prentice Hall, pp. 617-635.
Muttik, Igor, "Stripping Down an Anti-Virus Engine", Virus Bulletin Conference, Sep. 2000, pp. 59-68.
Radware, "Introducing 1000 x Security Switching", http://www.radware.com/content/products/sw/default.asp.

* cited by examiner

*Primary Examiner*—Kambiz Zand
*Assistant Examiner*—Peter Poltorak (57) ABSTRACT

A virus detection mechanism is described in which virus detection is provided by a network integrated protection (NIP) adapter. The NIP adapter checks incoming media data prior to it being activated by a computing device. The NIP adapter operates independently of a host processor to receive information packets from a network. This attribute of independence allows NIP anti-virus (AV) techniques to be "always on" scanning incoming messages and data transfers. By being independent of but closely coupled to the host processor, complex detection techniques, such as using check summing or pattern matching, can be efficiently implemented on the NIP adapter without involving central processor resources and time consuming mass storage accesses. The NIP adapter may be further enhanced with a unique fading memory (FM) facility to allow for a flexible and economical implementation of polymorphic virus detection.

20 Claims, 9 Drawing Sheets

METHODS AND APPARATUS FOR INTERFACE ADAPTER INTEGRATED VIRUS PROTECTION

FIELD OF INVENTION

The present invention relates generally to improved virus detection methods for computer and communication use.

BACKGROUND OF INVENTION

Most malicious software such as computer viruses, Trojan horses, and Internet worms spread around the globe through ubiquitous networks. A computer virus can cause a global epidemic in a matter of hours due to inter-continental connections of machines, thus causing costly and sometimes irreversible damage. For example, in May 2000, the Love Bug virus caused more than 10 billion dollars in damages worldwide. Spyware, even though it may not maliciously cause damage to a computer system, represents software that is usually hidden from a user who is unaware of its function, for example, to report user activity for advertising purposes. A spyware program is similar to a Trojan horse and is considered malicious software, in the context considered here, since it may send key entry information containing passwords and credit card numbers, and it is desirable to detect and prevent such operations.

The term virus is used broadly herein to reference malware, including specific forms of viruses, Trojan horses, spyware, and internet worms. Current Anti-virus (AV) techniques are typically software based and have major weaknesses in combating the spread of malicious software. One of these weaknesses is that anti-virus software looks for viruses after the viruses have already entered a computer system. Another weakness of current AV solutions is that AV programs cannot be run all the time because they consume a significant amount of computing resources. Consequently, there is a high likelihood that a malicious software program has run multiple times before the anti-virus software has been run. With increasing sophistication, malicious software programs are applying techniques to hide from or in some fashion deal with AV software, thereby making their detection and removal even more difficult.

Other problems with current AV solutions are that the virus search procedures are long and AV processing time may vary each time a search is done due to file system changes. The virus search procedures are in part lengthy due to requiring a significant number of disk accesses. Also, virus search procedures are typically based on a search string or a checksum calculation depending upon the file size being checked. Such search procedure operations are time consuming and compute resource intensive. Consequently, there is a need for an efficient virus detection system that operates to protect a system from being infected.

SUMMARY OF INVENTION

Among its many aspects, one embodiment of the present invention addresses a virus protection system for a host processor using a media interface adapter with an integrated virus protection engine. A host memory stores software drivers, host anti-virus (AV) programs, media data, and media data descriptors and the host processor executes the software drivers and host AV programs based on the virus protection afforded by the media interface adapter. The media interface adapter may suitably employ an external media interface to accept media data for processing, an integrated virus protection engine to check media data for virus signatures indicative of suspect data and generate a media data descriptor with a suspect data indicator, and an internal host processor and host memory interface for moving media data and the media data descriptor to the host memory and for informing the host processor of the data transfer. Depending upon the system design, a processor bridge complex may be used for interfacing the host processor and host memory with the media interface adapter.

Also, among its several aspects, another embodiment of the present invention addresses a virus protection system for protecting a host processor memory subsystem against polymorphic viruses using a media interface adapter with an integrated polymorphic virus protection engine. The media interface adapter may suitably employ an external media interface to accept media data for processing, an integrated fading memory polymorphic virus protection engine to check media data for a concentration of opcode related match events indicative of suspect data and generate a media data descriptor with a suspect data indicator, and an internal host processor and host memory interface for moving media data and the media data descriptor to the host memory and for informing the host processor of the data transfer A more complete understanding of the present invention, as well as other features and advantages of the invention, will be apparent from the following detailed description and the accompanying drawings.

DETAILED DESCRIPTION

The present invention will now be described more fully with reference to the accompanying drawings, in which several presently preferred embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
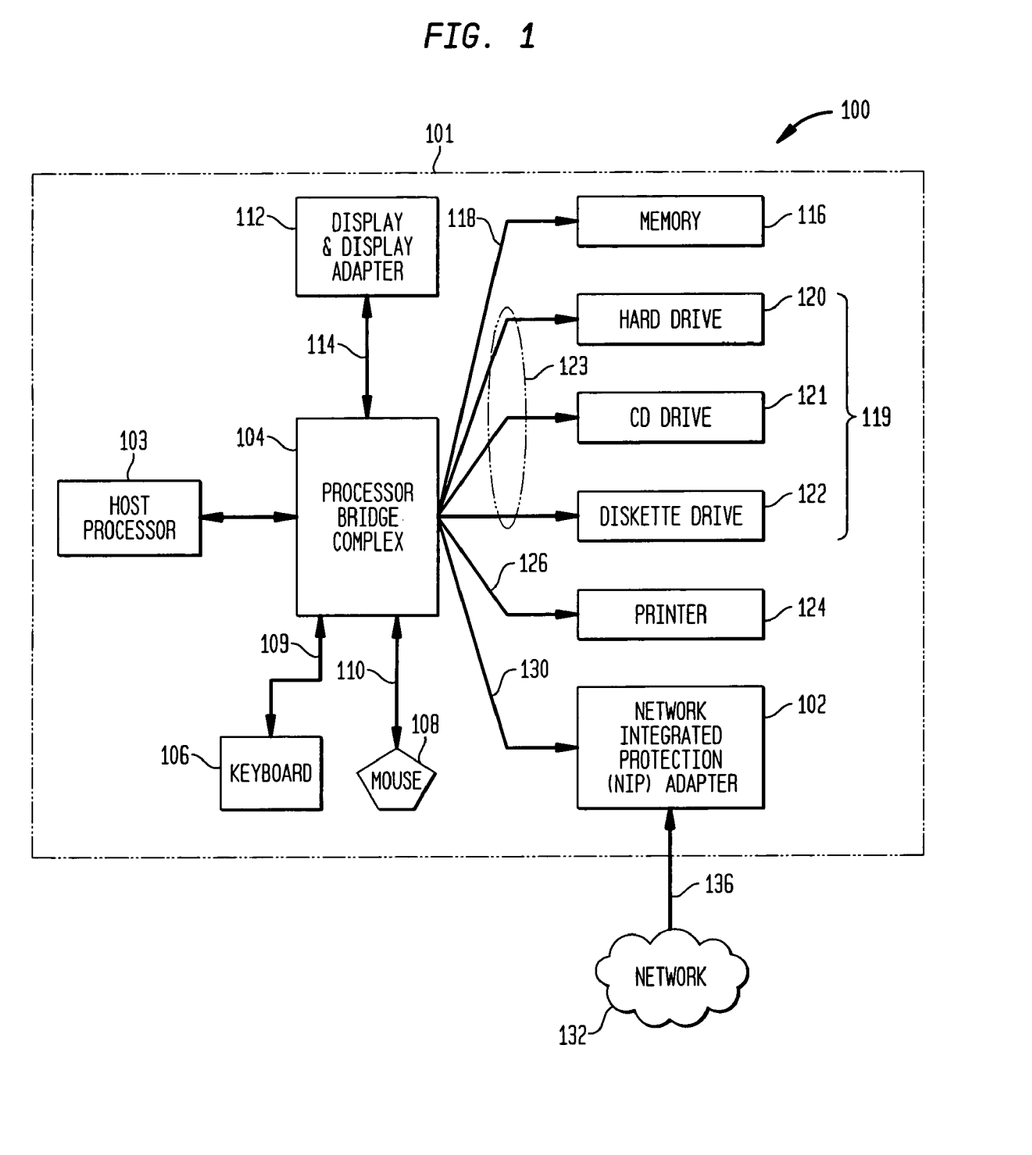
FIG. 1 illustrates a network and computer system in which a network integrated protection interface adapter in accordance with the present invention may be suitably employed.

FIG. 1 illustrates a network and computer system 100 using a network integrated protection (NIP) adapter 102 designed to provide efficient virus detection capabilities as discussed further below. Computer system 101 may be embodied as a network connected personal computing device, such as a personal computer, a personal data assistant (PDA), intelligent phone, or the like, and may also be a server in a network system, such as a world wide web Internet server, a local intranet server, or the like. Such a personal computing device or server typically consists of a host processor 103 and processor bridge complex 104 that provides processing services and internal processing interfaces to devices supporting the host processor and processing environment. Such devices include a keyboard 106 and mouse 108 with associated interfaces 109 and 110, display and display adapter 112 with interface 114, such as an accelerated graphics port (AGP) interface, and a memory 116, such as double data rate synchronous dynamic random access memory (DDR SDRAM) with a high performance memory interface 118. The processor bridge complex also typically supports media streaming data devices 119, such as a hard drive 120, a CD drive 121, and a diskette drive 122, or the like with associated streaming data device interfaces 123, such as an integrated drive electronics (IDE) interface and a floppy disk interface. A printer 124 with a printer interface 126 and other input/output (I/O) interfaces to the external environment may also be provided. The NIP adapter 102 with an internal interface 130 provides an interface with network 132 as addressed further below.

Interfaces, such as interfaces 110, 114, 118, 122, 126, and 130, are typically individually optimized. For example, optimization may be required for high speed memories, unique display adapters, or the like. Alternatively, some combination of common and unique interfaces may typically be employed in order to optimize the function, cost, and utility of the personal computing device or server. For example, the processor bridge complex 104 may internally include a north bridge chip and a south bridge chip, or may be a single chip supporting the desired interfaces in the computing device.

A network, such as the network 132, may consist of two or more computer systems, such as computer system 101, that are interconnected for the purpose of communicating between the two or more computer systems. Network 132 may be a local area network (LAN), wide area network (WAN), wireless local area network (WLAN), home area network (HAN), or the like. Network 132 may utilize varied topologies, such as star, ring, bus, and the like, and use various interfacing protocols, such as ethernet, token ring, the 802.11 standard, or the like. As shown in FIG. 1, the network 132 is connected to the computer system 101 through a network protocol interface 136, such as an Internet interface, to the NIP adapter 102 and the NIP adapter's internal interface 130. It is appreciated that depending upon technological process capabilities, the NIP adapter 102 and internal interface 130 may be integrated with processor complex electronics, as may be the case with many personal computing devices where, for example, cost and space are at a premium. The internal interface 130 is a tightly coupled interface providing low latency data paths between the NIP adapter 102 and memory 116. For example, direct memory loading of parameters to the NIP adapter 102 can be efficiently accomplished by a software driver or application programs running on the host processor 103. Also, direct memory access (DMA) may be utilized by the NIP adapter 102 to efficiently move data received over network protocol interface 136 and processed on the NIP adapter 102 to the memory 116.

Viruses are malicious software programs that are communicated via some media, such as on a diskette or CD through a media appropriate interface 123, or through a network interface, such as interface 136. As an illustration, the NIP adapter 102 is used herein to describe exemplary circuitry and techniques to efficiently detect viruses that attempt entry into a computer system through a network interface, such as interface 136. It is realized that the techniques of the present invention may also advantageously be applied to the media devices 119 using the concepts and techniques described herein.

Typically, virus detection mechanisms are software programs that run on a host processor in an attempt to find viruses that have already entered the processor memory, may have become active, and may have caused damage to data files or programs. Once a virus has entered the processor memory, it may be active and may actually attempt to hide itself from AV software. The present invention recognizes that detecting a virus prior to it entering processor memory and prior to it being activated, can minimize or in some cases eliminate a virus threat to the computer system. Once a virus has been detected, the virus can be appropriately dealt with, by techniques such as, removal or isolation. By detecting a virus early in its local path of entry to processor memory, further information may be readily obtained, such as, information concerning network paths the virus followed provided in part by examination of packet information headers and the like. Such information is valuable in determining the source of an infecting virus and taking appropriate action in response to this source determination.

Due to the wide range of functions that may be in operation on a computing system, accurate and complete discernment of viruses may be difficult. The need or desire for complete discernment of viruses by the host processor AV software may be reduced if candidate or suspicious data can be detected early prior to becoming active in the system. With early identification, candidate or suspicious files may be handled in a special manner, for example, with enhanced detection AV software, with software that tends to preclude infection by a virus, for example with emulation techniques, by providing warnings to operators or other programs, and the like. In such manner, the resources available may be applied in a targeted manner rather than in the typical blunderbuss approach of checking all disk records or the like.

One advantageous location to place a new type of virus detection is on a network interface adapter, such as the NIP adapter 102. Thus, in addition to the appropriate network interface circuitry, NIP adapter 102 is modified as described further below. From a functional point of view, NIP adapter 102 operates independently of the host processor 103 to receive information packets from the network 132. This attribute of independence allows the co-located AV technique to be "always on" and operative to scan incoming messages and data transfers. It is noted that the NIP adapter may be implemented with an on-adapter processor and the virus detection mechanism may be a combination of both hardware and software for the purposes of detecting viruses. By being independent of the host processor, complex detection techniques, such as using check summing or hashing, can be efficiently implemented on the NIP adapter without involving central processor resources and time-consuming mass storage accesses. To further improve virus detection and perform malicious code cleaning functions, suspicious data may be further processed, either locally in the network adapter 102, or in host processor memory after being moved there in a guarded fashion. This flexibility allows further cost optimization tradeoffs to be made depending upon the computing system, be it a personal computing device or a server.

The inclusion of the NIP adapter 102 of the invention in the computer system 101 provides a substantial barrier to malicious code irrespective of malicious code protection policies implemented in the local network, such as a private company LAN, Internet service provider (ISP) at home, or wireless networks in public spaces, with which computer system 101 may communicate. Unfortunately, such policies may be inconsistent at best and grossly inadequate or nonexistent at worst. This additional protection barrier is especially relevant to terminals used for diverse purposes or used in a nomadic fashion, connecting to urban public access points for instance. In a biological analogy, the NIP adapter may be viewed as analogous in its function to a personal face mask that one would wear at all times in an environment where aerial transmission of diseases is possible.

Figure 2:
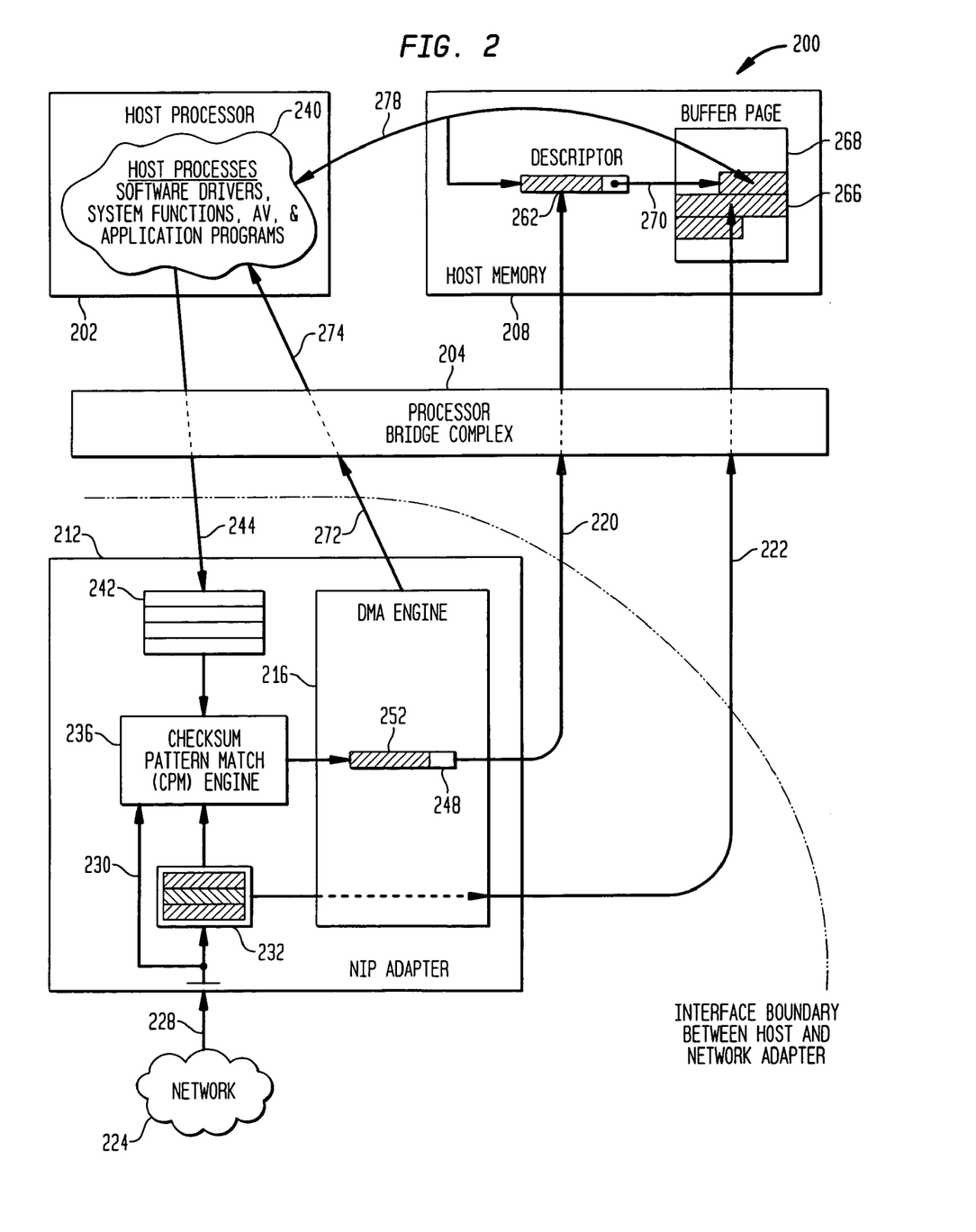
FIG. 2 illustrates a first network integrated protection (NIP) system providing efficient virus detection capabilities in accordance with the present invention.

FIG. 2 illustrates a first network integrated protection (NIP) system 200 providing efficient virus detection capabilities for host processor 202 including host memory 208. The host processor 202 runs host processes 240 including software drivers, system functions, such as operating systems, AV programs, and application programs, such as word processing, engineering and scientific applications, and the like. The software drivers are specialized software functions that interface with system devices such as keyboard and mouse, display, printer, and a first NIP adapter 212. A software driver typically provides set up operations to prepare an interface adapter for a desired operation, such as loading parameters specific to the interface adapter. For example, to support virus detection operations, such as processing a check sum and specific pattern matching, a set of virus signatures are stored on the NIP adapter 212. Each virus signature represents at least one virus or may represent a family of viruses of similar type. These virus signatures are stored in the first NIP adapter 212 in virus signature storage 242 and are loaded, as indicated by path 244, with the latest available virus signatures under control of a first NIP adapter software driver running on host processor 202. The virus signature storage 242 may be implemented as registers, as non-volatile memory, such as a flash memory, which is a special type of electrically erasable programmable read only memory for the storage of data that can be updated as needed, or a combination of non-volatile memory and registers. Some of the factors used to determine the type of virus signature storage to be implemented include the number of virus signatures to be stored and the data rate required to access the virus signatures.

With this advantageous approach to virus detection, the virus detection capabilities of the computer system may be split between the NIP adapter 212 and host processor AV software, shown as one of the host processes 240, as described in greater detail below. Because of this split, there is an economic, performance, and protection tradeoff in determining the scope of AV protection provided by the NIP adapter with the scope of host AV protection. This approach is in comparison to previous systems where only host processor AV protection is used. As an example of this split, the NIP adapter can be used to detect the most virulent and current threats while the host processor AV software is used for final system virus detection. It is appreciated that as technology and system requirements allow, greater NIP adapter virus detection can be provided. It is further noted that the value of the NIP adapter is not lost even if the virus signature storage is relatively small, since the virus signature storage is dynamic, with new signatures loaded depending upon current virus threats, and any detection capability provided by the NIP adapter improves overall system protection and reduces the impact host AV software has on the computer system performance.

In typical operation, the first NIP adapter 212 receives communication packets, or data frames, from a network 224 over a network connection path 228. The data 230 received over network path 228 is buffered in receive data buffers 232 which may be multiple data buffers to handle multiple data frames depending upon the data rates of the network path 228. The data 230 may be processed on the fly by a checksum/pattern match engine (CPM) 236 depending upon the system interface performance requirements. In addition, a buffered data frame may also be made available from data buffers 232 for processing by the CPM engine 236. In a presently preferred embodiment, the CPM engine 236 will be implemented in hardware due to the high speed interface data rates typically encountered.

After the CPM engine 236 completes its analysis of an incoming data packet, a suspicious bit or bits 248, other pattern matching results, and network information are set in a data descriptor 252. A single bit may be used to indicate suspect data or multiple bits may be provided for additional information concerning the results of the local AV analysis. The data from data buffers 232 and the data descriptor 252 are then sent to host memory 208 using, for example, a direct memory access (DMA) engine 216. The DMA engine 216 is used to move data between the first NIP adapter 212 and host memory 208, over closely coupled data interfaces indicated by paths 220 and 222, with minimal intervention of the host processor. The data descriptor 252 may be sent over in a separate operation, indicated by path 220, to a specific data descriptor destination address 262 in host memory 208. For future processing needs, the data is also likely to be sent over to host memory 208 in a separate operation, indicated by path 222, to a separate data buffer 266 allocated space in a buffer page 268 in the host memory 208. In such a case, with the data descriptor 262 separately stored from its associated data 266, the data descriptor 262 may contain a link address 270 to the data. Once the data descriptor and associated data have been moved to host memory, the first NIP adapter 212 sends an interrupt 272 to the processor bridge complex 204 which invokes, by a standard interrupt vector 274, the appropriate software driver or function from the host processes 240 to access and process the data 266 and data descriptor 262, as indicated by access path 278. The invoked software driver or function initially evaluates the suspicious bit or bits 248 stored in the data descriptor 262. If the suspicious bit or bits 248 indicate a virus may be present, suspicious code handling routines are initiated.

Figure 3A:
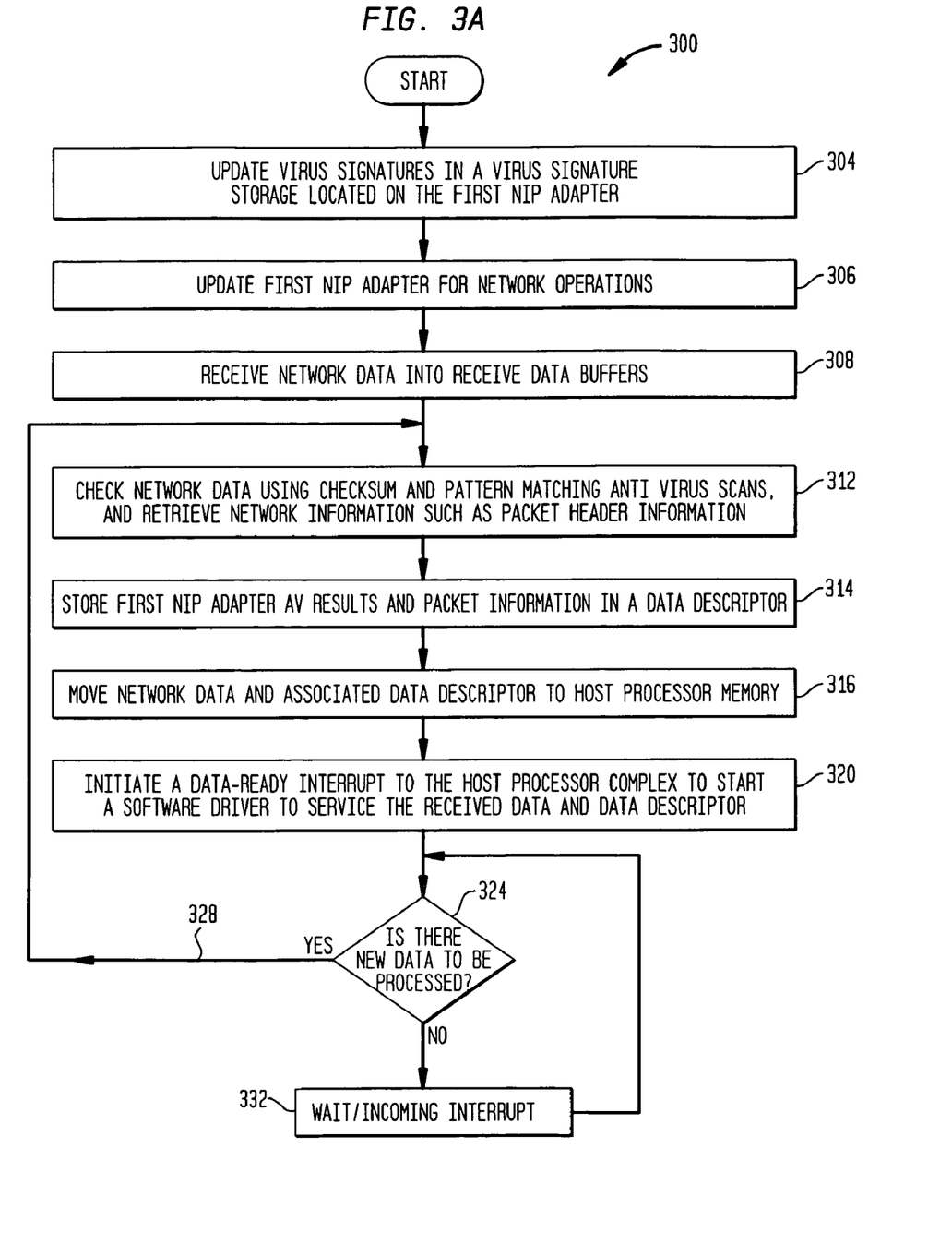
FIG. 3A illustrates an exemplary flow of virus protection operations for the first NIP adapter of FIG. 2.

FIG. 3A illustrates an exemplary virus protection process 300 implemented by the first NIP adapter 212 to provide efficient virus detection on data received from network 224 before that data reaches the host processor 202 and host memory 208. On initialization of the first NIP adapter 212, or on an ongoing basis, as needed to update the virus signatures, the first NIP adapter virus signature storage is loaded with virus signatures in step 304. In step 306, the first NIP adapter 212 is further initialized or updated for network interface operations as required by the personal computing device or server, as is well known to one skilled in the art. The virus detection capabilities of the first NIP adapter 212 primarily come into play upon receipt of data arriving into the system, in this case, from the network 224. In step 308, the first NIP adapter 212 receives network data, such as a data packet or data frame, into the receive data buffers 232. In step 312, the checksum/pattern match engine 236 processes the network data. For example, such processing preferably proceeds in real time as data is being received. The CPM engine 236 processes may advantageously include using check sum and pattern matching, AV scans, and retrieval of network information, such as packet header information. In step 314, the AV results and network information are stored in the data descriptor 252. The stored information includes a suspicious bit or bits 248 determined as a result of the AV process.

After AV processing, in step 316, the first NIP adapter 212 moves the network data and associated data descriptor to the host processor complex memory 208. Such data movement may be obtained by use of tightly coupled DMA operations or the like through the processor bridge complex 204 as indicated by paths 220 and 222 in FIG. 2. After the data movement is complete, in step 320, the first NIP adapter 212 initiates a data-ready interrupt 272 to the host processor complex 204 to start, by a standard interrupt vector 274, a software driver to service the received data 266 and data descriptor 262. In decision step 324, the first NIP adapter 212 then checks whether there is new data to be processed.

If new data has been received or is being received in the data buffers 232 and is ready for processing, the process 300 returns by way of yes path 328 to step 312 to begin AV scanning and network information retrieval on the newly received data. If there is no further data to be processed, the first NIP adapter 212 waits in step 332 before returning to decision step 324. It is noted that the wait period 332 may alternatively be used for other processing operations by the first NIP adapter or may be a dormant period waiting for an interrupt or similar type event to initiate data processing.

Figure 3B:
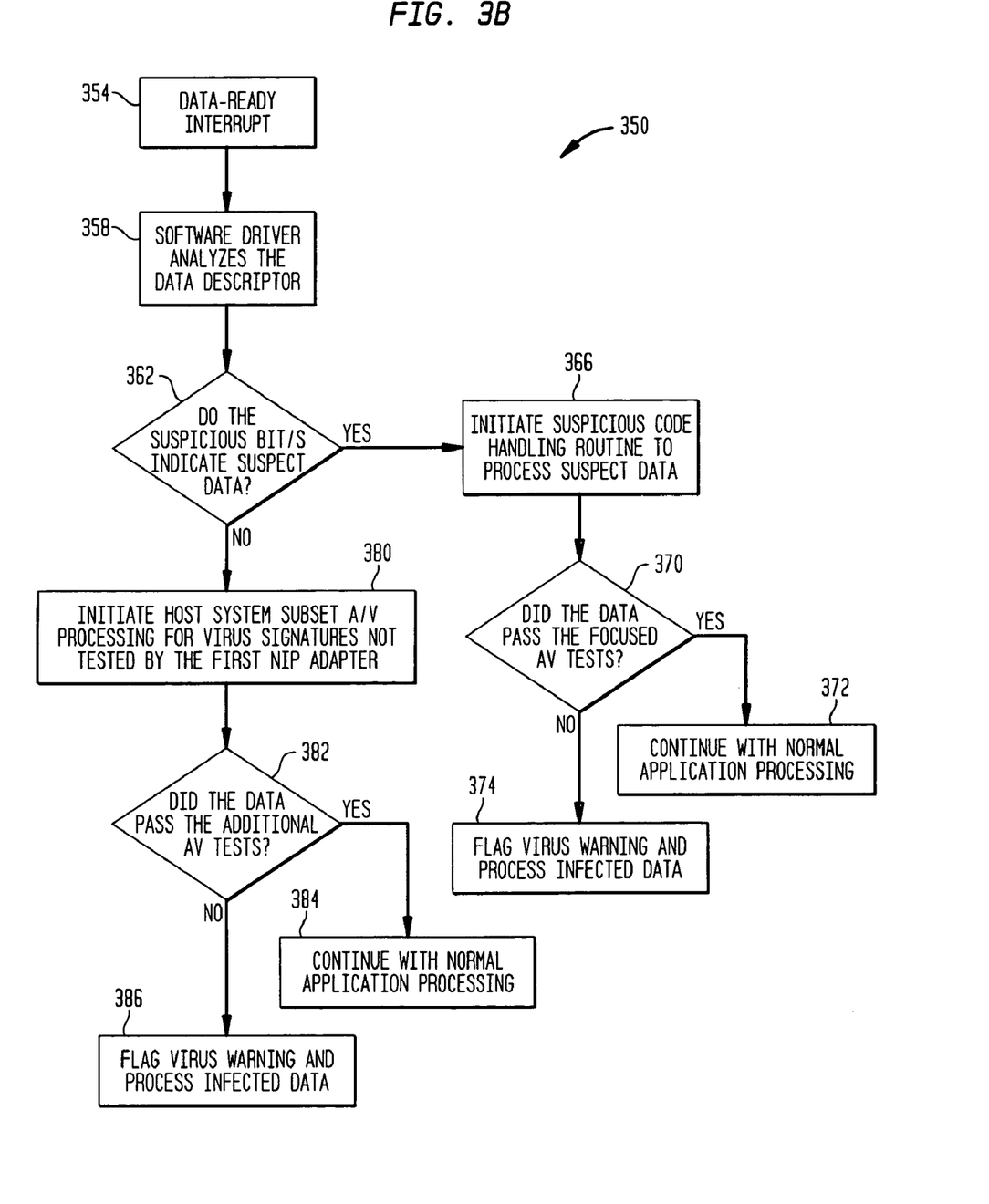
FIG. 3B illustrates an exemplary flow of operation sequences for a host processor and memory working in conjunction with the first NIP adapter of FIG. 2.

FIG. 3B shows an exemplary process 350 illustrating a sequence of operations for the host processor 202 and memory 208 working in conjunction with the first NIP adapter 212. On the host processor 202, a data-ready interrupt 272 sent by the first NIP adapter 212 causes a standard interrupt vector 274, indicated by step 354. As a consequence, in step 358, a software driver begins to analyze the sent data descriptor 262. In decision step 362, it is determined whether the suspicious bit or bits indicate suspect data which may indicate a possible virus. If the suspicious bit or bits are indicative of a possible virus, a suspicious code handling routine is initiated in step 366 to process the suspect data in a manner consistent with the application software process that is supposed to consume this data. The AV routines running in step 366 could be similar to components of regular AV software. For example, the AV routines of step 366 may perform more advanced static virus detection using pattern match and check-sum techniques over longer patterns for instance. Beyond such operation, appropriate information could be sent to a set of standard AV software routines to perform other handling and cleaning procedures. The main difference between the invoked AV software routines of step 366 and a standard approach using AV software on the computer system is that the AV software routines of step 366 do not have to process database file searches and lengthy file accesses since the data at this point is not part of the file system on a disk and suspicious code has already been spotted by the NIP adapter. Thus, the processing is advantageously targeted. It is also important to note that these routines, of step 366, should perform their tasks faster than the standard AV software approach since there are minimum or no disk file accesses and data transfers involved. At this point in the processing sequence, the data 266 and data descriptor 262 are stored in quickly accessible host memory that has not yet been handed over to system software. In decision step 370, a determination is made whether the data passed the focused AV tests of step 366. If the data passed, then, in step 372, normal application processing may continue. If the data did not pass the focused AV tests of step 366, then, in step 374, a virus warning is flagged and AV software may appropriately process the infected data.

In step 362, if the suspicious bit or bits do not indicate a possible virus, then the data may be suspect for other viruses not checked by the first NIP adapter. Consequently, in step 380, host system subset AV software, for virus signatures not tested by the first NIP adapter, is invoked. In decision step 382, a determination is made whether the data passed the additional AV tests of step 380. If the data passed, then, in step 384, normal application processing may continue. If the data did not pass the additional AV tests of step 380, then in step 386, a virus warning is flagged and AV software may appropriately process the infected data. It is noted that if the first NIP adapter had a full complement of virus signatures locally and sufficient or high confidence AV detection capabilities, as dependent upon technology and system requirements, then, if the suspicious bit or bits do not indicate suspect data, the host processor could branch to the step 384, bypassing steps 380 and 382, and continue with normal application processing of the data in step 384.

The first NIP adapter 212 with its integrated virus detection hardware and software capabilities can perform a number of the AV operations in real time, such as check summing, at incoming data rates compatible with modern LANs. Even though most viruses can be detected by a signature matching procedure, as described with regards to FIG. 2 and FIGS. 3A and 3B, some viruses may need unique processing approaches. Polymorphic viruses form one such category of viruses. Polymorphic viruses may encrypt their body and randomly mutate their decryption routine making them difficult to detect using a virus signature method. Virus decryption code is not encrypted since it must execute to decrypt the rest of the virus, but the virus decryption code may mutate without changing its function. This mutation effect makes detecting polymorphic viruses difficult. It has been observed that by monitoring the opcodes or unique patterns of opcodes used in suspect data code segments, statistics of opcodes and patterns of opcode use can be generated that indicate characteristics attributable to polymorphic viruses. The opcodes being monitored consist of host processor instruction opcodes. Such statistical opcode evaluation methods and other exemplary methods of detecting polymorphic viruses in the context of their use in the present invention are described in further detail below.

Figure 4:
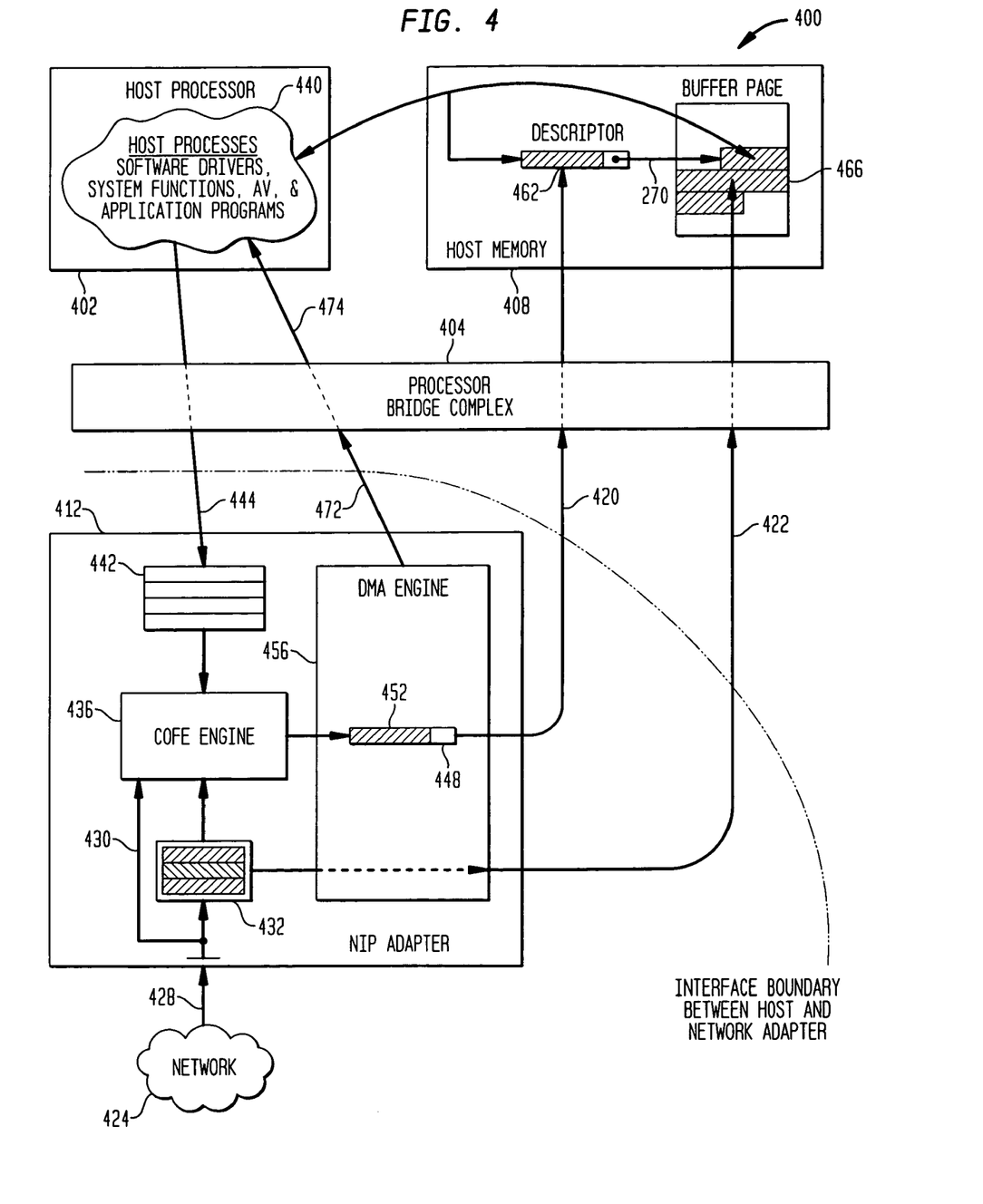
FIG. 4 illustrates a second NIP system providing protection from polymorphic viruses in accordance with the present invention.

FIG. 4 illustrates a second NIP system 400 providing the capabilities of the first NIP adapter 212 plus providing additional capabilities to protect a system from polymorphic viruses. By modifying the checksum/pattern match engine 236 as discussed below, a new second NIP adapter 412 is created that includes a checksum/pattern match opcode frequency estimation (COFE) engine 436. In addition to virus signatures, opcodes and patterns of opcode usage that are characteristically used by a specific polymorphic virus or families of polymorphic viruses, are stored on the second NIP adapter 412 in an AV virus parameter storage 442. For example, storage 442 may be implemented as a set of AV variable registers or as a high speed non-volatile memory. The opcodes and virus signatures may be updated as necessary by loading the virus parameter storage 442 from a host processes software driver 440 as illustrated by path 444. Incoming data 430 received from network 424 over network interface 428 is buffered in receive buffers 432 and made available for processing by the COFE engine 436. Since complete file transmissions may consist of multiple data frames, varying evaluation window sizes may be specified in which opcode frequency use is measured. The window size may be programmable and determined heuristically or through knowledge of the virus being looked for. Through the use of multiple small windows, multiple statistical patterns of opcode usage throughout a code segment may be determined. The primary characterization of data being analyzed at this point is through the network packet header which may affect the AV routines accordingly. It is noted that the opcode usage statistics could also to be maintained over individual data streams, that are differentiated by transmission control protocol (TCP) connection information in the packet headers, for example.

The window size may be determined heuristically. For example, on a 32-bit instruction width machine, one suitable data window could be on the order of a hundred 32-bit words. Note that the window might overlap several data frames. The window size is determined through experimentation when possible and guided by knowledge of the virus family. It has been found that opcode usage statistical analysis can lead to a high rate of detecting polymorphic viruses even when a polymorphic virus modifies its signature pattern by mixing or adding code that does not affect the functionality of the virus after the virus mutates. The results of the opcode usage evaluation may be included in the data descriptor 452 and the suspicious bit or bits 448 may be enhanced to indicate the suspected type of virus found. Once the data is prepared, the DMA engine 456 moves the data descriptor 452 and data 432 through the processor bridge complex 404 to the host memory 408. This data movement is illustrated as being over tightly coupled paths 420 and 422, respectively. The data descriptor and data are stored in separate locations in host memory accessible as descriptor 462 and data 466. Specialized host processes software 440 is invoked by a data-ready interrupt 472 that causes a standard interrupt vector 474 to invoke a software driver that checks the descriptor suspicious bit or bits in determining the type of processing necessary.

Figure 5A:
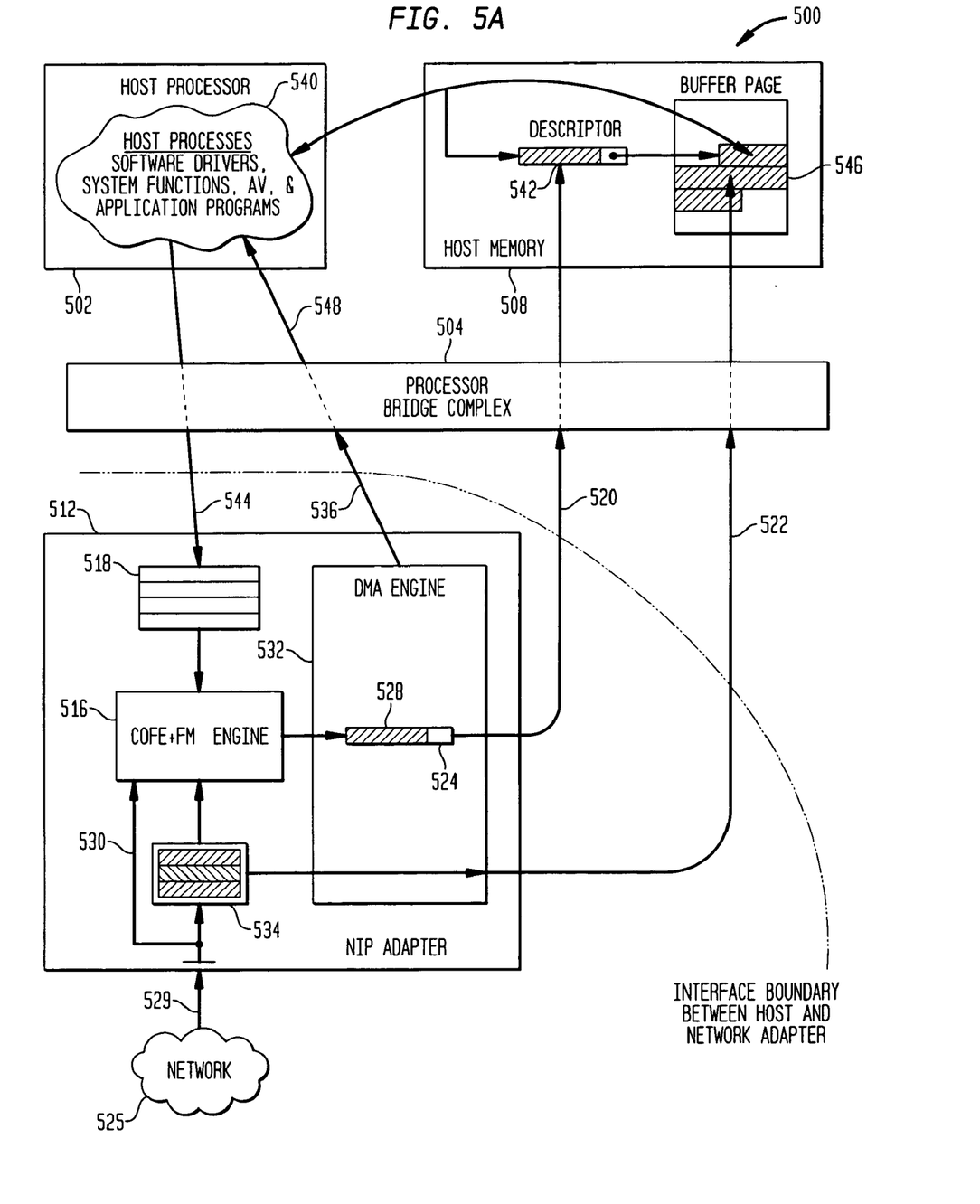
FIG. 5A illustrates a third NIP system providing a fading memory facility for enhanced polymorphic virus detection in accordance with the present invention.

FIG. 5A illustrates a third NIP system 500 with a third exemplary NIP adapter 512 in accordance with the present invention. NIP adapter 512 provides the capabilities of the second NIP 412 COFE engine 436 plus a fading memory (FM) facility to allow for a flexible and economical implementation of polymorphic virus detection. The third NIP adapter 512 uses a COFE+FM engine 516 and stores additional parameters, such as FM parameters, in virus parameter storage 518. The FM parameters associated with the FM facility may include an opcode match count value, match event data window, threshold compare values, decay law parameters, and the like. Further, an indication of suspect data and additional information may be stored in the suspicious bit or bits 524 and data descriptor 528 associated with use of the FM facility for polymorphic virus detection.

Figure 5B:
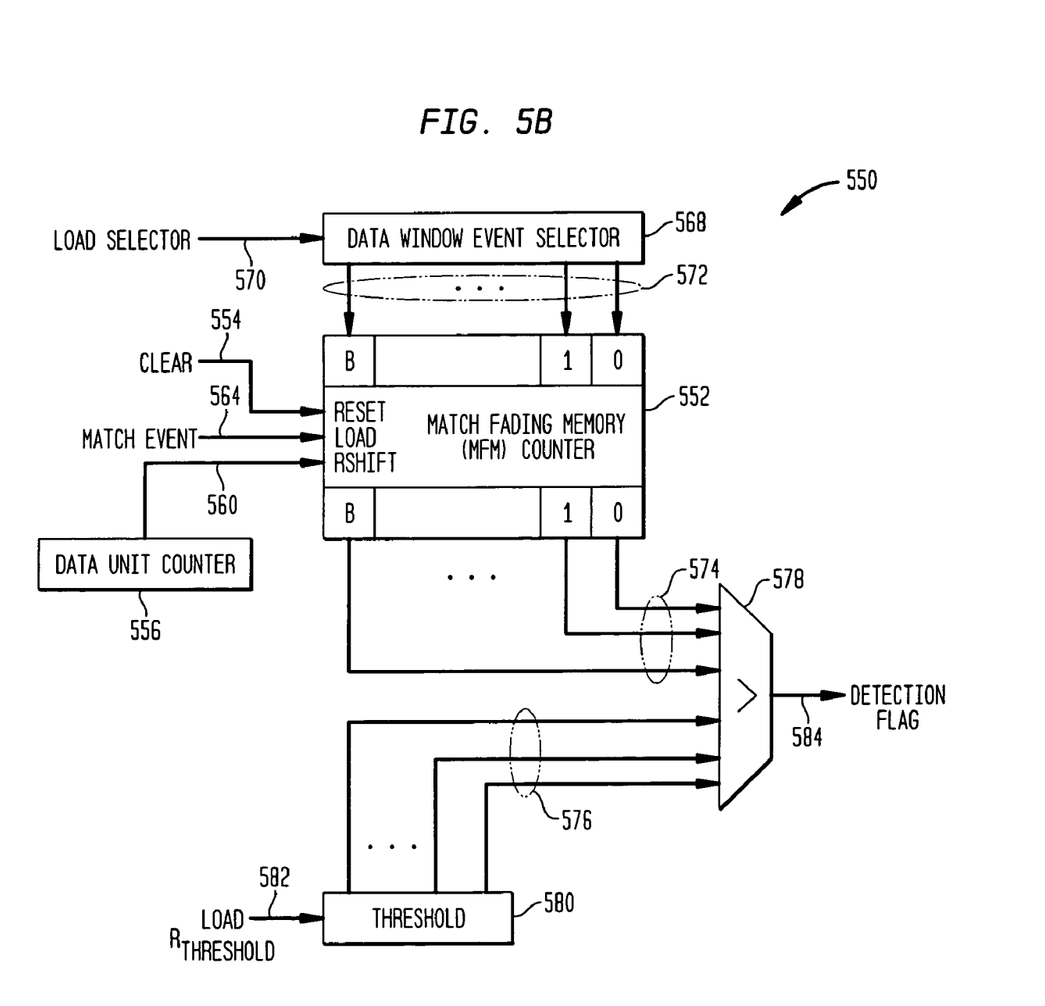
FIG. 5B illustrates an exemplary fading memory facility for enhanced polymorphic virus detection in accordance with the present invention.

FIG. 5B illustrates an embodiment of an FM facility 550 to be used in the COFE+FM engine 516 for flexible and economic polymorphic virus detection. The FM facility 550 contains at least one match fading memory (MFM) counter, such as illustrated MFM counter 552, and may contain up to K MFM counters. Each MFM counter circuit is associated with a specific virus or family of viruses and each virus or family of viruses can be characterized by a statistical usage of specific opcodes or patterns of opcode usage. The MFM counters are B-bit counters where B is determined from statistics of known and anticipated polymorphic viruses.

For example, B may be 32-bits or 64-bits to provide a range of values that may be used in the MFM counters. The MFM counters are initialized to a zero count value by a clear signal 554. A data unit counter 556 counts the number of incoming data units, for example, data bytes received over the network and the data unit counter rolls over by returning to a zero count value when the count value reaches a programmed characteristic "data time". The characteristic "data time" is a value stored in virus parameter storage 518. The characteristic "data time" for an exponential decay law is the number of received data units after which the value of an MFM counter is halved. For example, if an MFM counter starts with a value of 32, binary value 0 . . . 0100000, then, when the number of received data units equals the programmed characteristic "data time" value, the MFM counter value is divided by 2 to a value of 16, binary value 0 . . . 0010000. A divide by 2 exponential decay law operation can be obtained by shifting right the MFM counter values by 1 bit, representing a divide by 2 of the MFM counter value, every time the data unit counter 556 generates a characteristic "data time" indication. Note that when the MFM counter value is 1 and the next characteristic "data time" signal occurs, the MFM counter value shifts the 1 bit out of the least significant bit position and the MFM counter value is 0. In FM facilities made up of multiple FM counters, each time the data unit counter 556 rolls over, all the MFM counters associated with the data stream being tested receive a right shift (RShift) input 560, dividing their current MFM values by 2. It is noted that a decay law may specify a subtraction of a fixed amount, such as a subtraction by 1, a right shift by a fixed amount, such as, the above mentioned divide by 2 shift right by 1 operation, or other such operation as determined by the chosen decay law.

The MFM counter values that are shifted are obtained by recording match events. When data is received, the data is compared to detect specific opcodes or patterns of opcode usage. If a specific opcode or pattern of opcode usage is detected, a match event signal 564 is generated that causes a value, representing a data window for that match event, to be loaded in the MFM counter, associated with the match event and thereby with a virus or family of viruses. The data window value may be programmable and stored in virus parameter storage 518. The data window value represents the number of shift operations required to lose memory of a match event. In other words, the memory of the match event fades. In this case, the data window value, related to a match event, decreases in binary value as more data is received. The data window value is loaded into a data window event selector 568 in an initialization using load selector signal 570. It is from the data window event selector 568 that the data window value, as represented by the range of output bit positions 572, is loaded in the MFM counter 552. If multiple match events occur within a characteristic "data time" period, the number of match events during the characteristic "data time" period are added in the data window event selector 568 and the summation result is loaded into the MFM counter replacing the previously loaded value.

For example, if bit position 20, $2^{20}$, representing a data window is loaded into an MFM counter upon a single match event and a second match event occurs within the characteristic "data time" period, a value of $2^{20}+2^{20}=2^{21}$, bit 21, is loaded into the MFM counter replacing the previously loaded bit 20. It is noted that bit positions less than the data window value, such as less than bit 20 above, are not affected by the match event load operation. In other words, previous match events are maintained and continue to have less and less affect on the total MFM count value as each characteristic "data time" shift occurs. By not affecting bits less than the data window value, the load operation is in effect an addition of a new match event with previously stored, but shifted match events.

The MFM counter value 574 is compared to a threshold value 576 in comparator 578. The threshold value 576 is provided by a programmable threshold register 580 which may be one of the storage values of virus parameter storage 518. The threshold register 580 may be initialized or updated by a load RThreshold signal 582. If the value of the MFM counter 574 exceeds the specified threshold 576, then a detection flag 584 is set. The detection flag 584 may be one of the suspicious bit indicators stored in data descriptor 524. Once the detection flag and associated suspicious bit information are set, the detection flag's associated counter may be reinitialized for the next data window detection period by use of the clear signal 554.

The fading memory technique is used to estimate the concentration of chosen opcodes or patterns of opcode usage in a received data stream rather than keep track of individual opcode related statistical information. If match events within the data stream being examined are found close together, as determined by the characteristic "data time" of the decay law, the MFM counter value will increase and go above the specified threshold. The fading memory technique allows the concentration of match events to be evaluated.

Figure 6A:
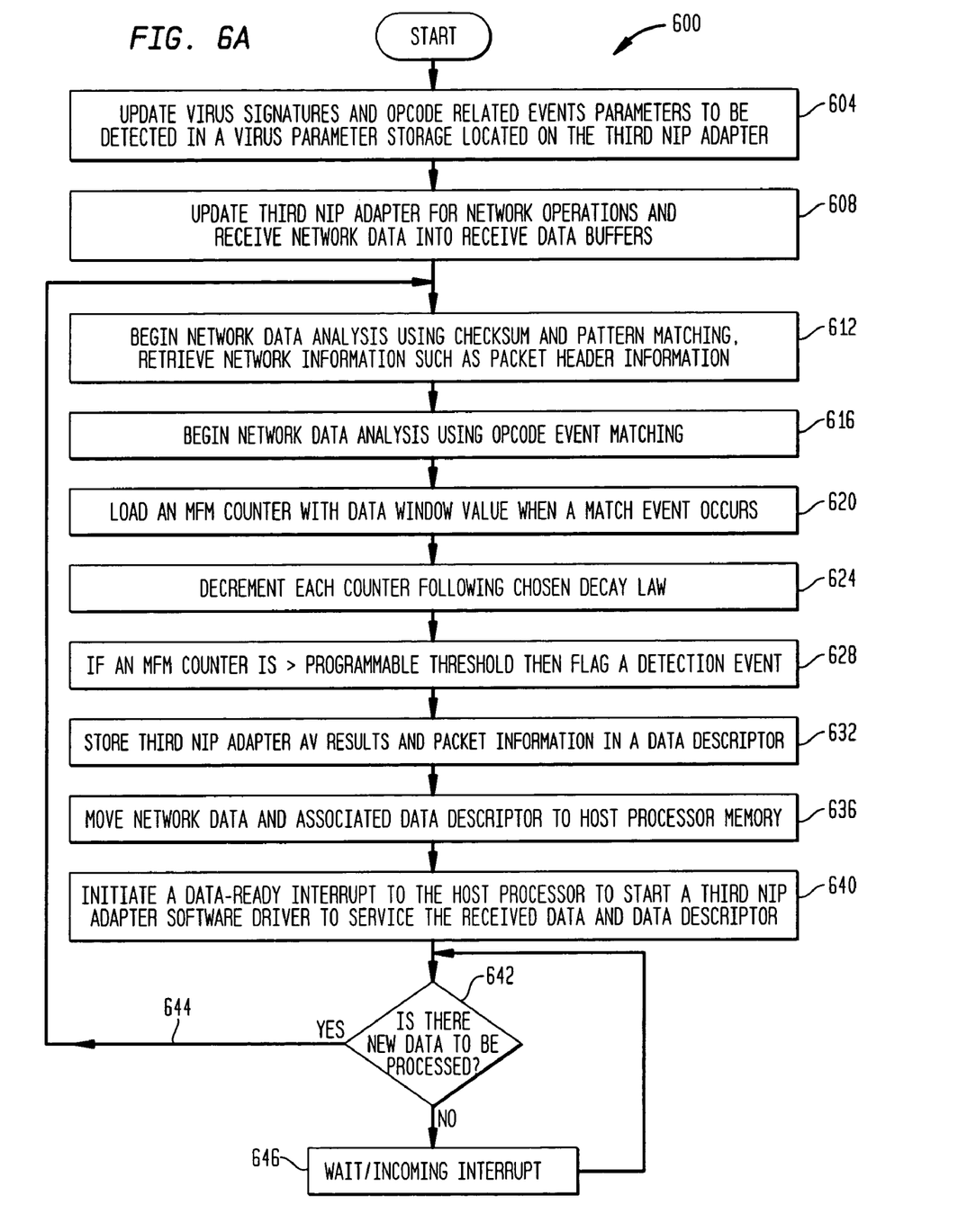
FIG. 6A illustrates an exemplary flow of virus protection operations of a fading memory technique for polymorphic virus detection for the third NIP adapter of FIG. 5A.

FIG. 6A shows a process 600 illustrating an exemplary flow of virus protection operations implementing the fading memory technique for polymorphic virus detection for the third NIP adapter 512. In step 604, on initialization of the third NIP adapter 512, or, for example, as needed by the availability of new virus signatures or new opcodes or patterns of opcode usage to be searched for, the third NIP adapter virus parameter storage 518 is updated. The third NIP adapter 512 is further initialized or updated for network interface operations as required by the personal computing device or server, as is well known to one skilled in the art. The virus detection capabilities of the third NIP adapter 512 primarily come into play upon receipt of data coming into the system, in this case, from the network 525. In beginning the processing of a new data stream, the integrated virus detection hardware is initialized. For example, the MFM counters are initialized appropriately.

In step 608, the third NIP adapter 512, having been initialized for network operation, then receives network data, such as a data packet or data frame, into the receive data buffers 534. The COFE+FM engine 516 then, in step 612, begins to process the network data, for example in real time as data is being received. Such processes may be selectable and include using check sum and pattern matching AV scans and retrieval of network information, such as packet header information. To support polymorphic virus detection, a fading memory opcode related event detection process is started in step 616, which may include an initialization step if a new data detection period is to be processed. For each match event, an MFM counter, associated with the match event, is loaded with a data window value initially obtained from virus parameter storage, in step 620. In step 624, according to the chosen decay law, such as an exponential decay law, the MFM counters are decremented, for example, by employing a right shift of the MFM count value as previously described with regard to fading memory facility 550, every characteristic "data time". If an MFM counter value exceeds a specified threshold then a detection flag is set in step 628. Next, in step 632, the AV scan results, suspicious bit or bits, and network information are stored in the data descriptor 528. After AV processing is completed for a received data segment, the third NIP adapter 512 in step 636 moves the network data and associated data descriptor to the host processor complex memory. Such data movement may be obtained by use of tightly coupled DMA operations 532 or equivalent over paths 520 and 522. After the data movement is complete, in step 640, the third NIP adapter 512 initiates a data-ready interrupt 536 to the host processor complex to start, by a standard interrupt vector 548, a software driver to service the received data and data descriptor.

The third NIP adapter 512 then checks in decision step 642 whether there is new data to be processed. If new data has been received or is being received in the data buffers 534 and is ready for processing, the process 600 returns by way of the yes path 644 to step 612 to begin AV scanning and network information retrieval on the newly received data. If there is no further data to be processed, the third NIP adapter 512 waits in step 646 before returning to decision step 642. It is noted that the wait period 646 may alternatively be used for other processing operations by the third NIP adapter or may be a dormant period waiting for an interrupt or similar type event to initiate data processing.

Figure 6B:
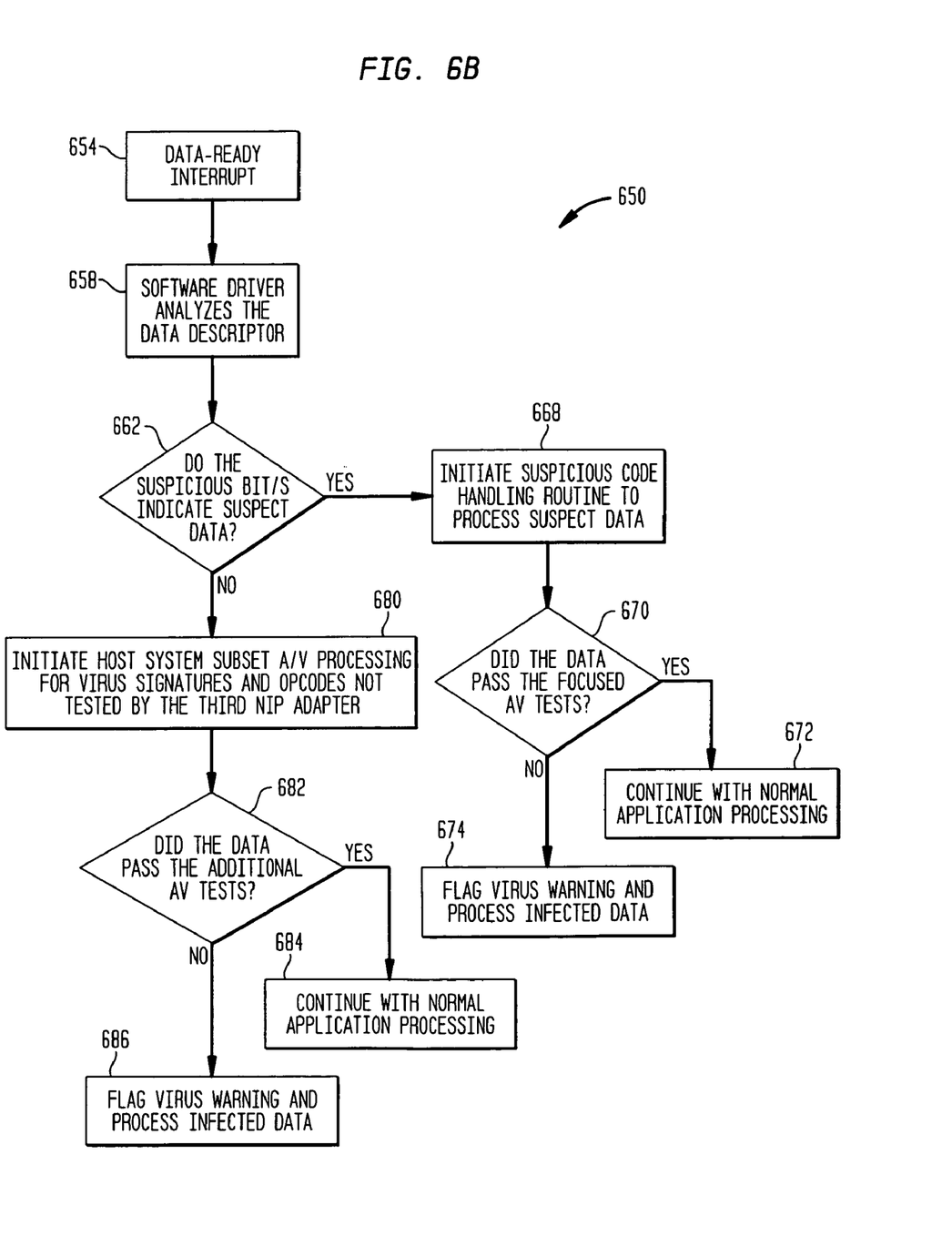
FIG. 6B illustrates an exemplary flow of operation sequences for a host processor and memory working in conjunction with the third NIP adapter providing polymorphic virus detection in accordance with the present invention.

FIG. 6B shows a process 650 illustrating an exemplary sequence of operations 650 for the host processor 502 and memory 508 working in conjunction with the third NIP adapter 512. As indicated by step 654, a data-ready interrupt 536 sent by the third NIP adapter 512 causes a standard interrupt vector 548 on the host processor 502. In response, a software driver analyzes in step 658 the sent data descriptor. In decision step 662, it is determined whether the suspicious bit or bits indicate suspect data and further information is assessed, such as determined by a polymorphic virus detection technique using a fading memory facility. Based on the suspicious bit or bits indicating a possible virus, appropriate code for handling the suspect data is executed in step 668 in a manner consistent with the application software process that is supposed to consume this data. The AV routines running in step 668 could be similar to components of regular AV software. For example, the AV routines of step 668 may perform more advanced static virus detection using pattern matching and check-summing over longer patterns for instance. Beyond such operation, appropriate information could be forwarded to a set of standard AV software routines to perform other handling and cleaning procedures. The main difference between the invoked AV software routines of step 668 and a standard approach using AV software on the computer system is that the AV software routines of step 668 do not have to process database file searches and lengthy file accesses since the data at this point is not part of the file system on a disk and suspicious code has already been spotted by the NIP adapter. It is also important to note that the routines of step 668 should perform their tasks faster than the standard AV software approach since there are minimum or no disk file accesses and data transfers involved. At this point in the processing sequence, the data 546 and data descriptor 542 are stored in quickly accessible host memory that has not yet been handed over to system software. In decision step 670, a determination is made whether the data passed the focused AV tests of step 668. If the data passed, then, in step 672, normal application processing may continue. If the data did not pass the focused AV tests of step 668, then, in step 674, a virus warning is flagged and AV software may appropriately process the infected data.

In step 662, if the suspicious bit or bits do not indicate a possible virus, then the data may be suspect for other viruses not checked by the first NIP adapter. Consequently, in step 680, host system subset AV software is invoked for specified virus signatures and opcodes not tested by the third NIP adapter. In decision step 682, a determination is made whether the data passed the additional AV tests of step 680. If the data passed, then, in step 684, normal application processing may continue. If the data did not pass the additional AV tests of step 680, then in step 686, a virus warning is flagged and AV software may appropriately process the infected data. It is noted that if the third NIP adapter had a full complement of virus signatures locally and sufficient or high confidence AV detection capabilities, as dependent upon technology and system requirements, then, if the suspicious bit or bits do not indicate suspect data, the host processor could branch to the step 684, bypassing steps 680 and 682, and continue with normal application processing of the data in step 684.

While the present invention has been disclosed in a presently preferred context, it will be recognized that the present teachings may be adapted to a variety of contexts consistent with this disclosure and the claims that follow.

We claim:

1. A media integrated protection adapter comprising:
   an external media interface to accept media data in incoming data frames for processing;
   an integrated virus protection engine that initiates a host processor opcode usage evaluation to check the media data in varying evaluation window sizes that encompass one or more of the incoming data frames for patterns of opcode usage indicative of suspect data and generate a media data descriptor having results of the opcode usage evaluation with a suspect data indicator that indicates a suspected type of virus found; and
   a system interface providing coupling to a host processor and host memory for moving the media data and the media data descriptor to the host memory in a data transfer operation and informing the host processor of the data transfer operation and to check the suspect data indicator.

2. The media integrated protection adapter of claim 1 wherein the integrated virus protection engine comprises:
   a storage unit for storing virus parameters including virus signatures and opcodes to be used in the opcode usage evaluation supporting virus protection operations on the media integrated protection adapter;
   a check sum, pattern matching, and opcode frequency estimation engine operative on received media data to detect virus signatures and multiple statistical patterns of opcode usage that are recorded in the media data descriptor; and
   data status registers for storing the media data descriptor with the suspect data indicator.

3. The media integrated protection adapter of claim 1 wherein the integrated virus protection engine comprises:
   a storage unit for storing virus parameters including host processor opcodes supporting virus protection operations on the media interface adapter;
   an opcode pattern match engine operative on received media data for determining opcode statistics comparable to virus opcode statistics to estimate a concentration over time of the host processor opcodes in the media data when the media data is received; and
   data status registers for storing the media data descriptor with the suspect data indicator.

4. The media integrated protection adapter of claim 3 wherein the concentration over time of the host processor opcodes in the media data is estimated by storing an opcode usage indication in a fading memory wherein the stored opcode usage indication fades with each occurrence of a programmed data time indication.

5. The media integrated protection adapter of claim 3 further comprising:
   an opcode pattern match engine operative on received media data for determining the patterns of opcode usage to estimate a concentration over time of the patterns of opcode usage in the media data.

6. The media integrated protection adapter of claim 1 wherein the integrated virus protection engine comprises:
   a storage unit for storing virus parameters including host processor opcodes, a data window value, a characteristic data time number, and a threshold;
   a match event engine operative on media data for detecting the host processor opcodes to generate a match event signal upon each detected host processor opcode;
   a data unit counter that generates a data time indication after counting the characteristic data time number of data units;
   at least one match fading memory (MFM) counter that upon receiving a match event signal is loaded with the data window value plus the MFM counter contents and the MFM counter contents are reduced upon receiving the data time indication from the data unit counter; and
   an output of the MFM counter is compared to the threshold generating a detection flag upon the threshold being exceeded for determining a suspect data indicator.

7. The media integrated protection adapter of claim 6 wherein the MFM counter contents are reduced by a divide by 2 shift operation.

8. The media integrated protection adapter of claim 1 wherein the host processor initiates additional virus detection processing on the media data that was moved to the host memory in response to a determination that the suspect data indicator indicates the media data is suspect.

9. The media integrated protection adapter of claim 1 operates externally from the host processor and initially checks the media data for viruses separately from the host processor when the media data is received from the external media interface.

10. A virus protection system comprising:
    a host memory for storing software drivers, host anti-virus (AV) programs, media data, and media data descriptors;
    a host processor for executing software drivers and host AV programs; and
    a media interface adapter having an external media interface to accept media data in incoming data frames for processing, an integrated virus protection engine that initiates an opcode usage evaluation to check the media data in varying evaluation window sizes that encompass one or more of the incoming data frames for multiple statistical patterns of opcode usage indicate indicative of suspect data, and generate a media data descriptor having results of the opcode usage evaluation with a suspect data indicator that indicates a suspected type of virus found, and an internal host processor and host memory interface for moving the media data and the media data descriptor to the host memory in a data transfer operation and informing the host processor of the data transfer operation to check the suspect data indicator to determine a type of processing appropriate for the media data.

11. The virus protection system of claim 10 wherein the integrated virus protection engine comprises:
    a storage unit for storing virus parameters including virus signatures and opcodes to be used in the opcode usage evaluation supporting virus protection operations on the media interface adapter;
    a check sum, pattern matching, and opcode frequency engine operative on received media data to detect the virus signatures and the multiple statistical patterns of opcode usage; and
    data status registers for storing a media data descriptor with a suspect data indicator.

12. The virus protection system of claim 10 wherein the integrated virus protection engine comprises:

a storage unit for storing virus parameters including host processor opcodes supporting virus protection operations on the media interface adapter;

a match event engine operative on received media data for detecting the host processor opcodes to generate a match event signal that is stored as a data window value for that match event in a fading memory where the stored data window value fades with each occurrence of a programmed data time indication; and data status registers for storing a media data descriptor with suspect data indicator.

13. The virus protection system of claim 12 further comprising:

programmable registers storing a data window value, a characteristic data time number, and a threshold;

a data unit counter that generates a shift signal after counting the characteristic data time number of data units;

at least one match fading memory (MFM) counter that upon receiving a match event signal is loaded with the data window value plus the MFM counter contents and the MFM counter contents are shifted right one bit position upon receiving the shift signal from the data unit counter causing the data window value to fade with each occurrence of the shift signal; and the output of the MFM counter is compared to the threshold generating a detection flag upon the threshold being exceeded for determining a suspect data indicator.

14. The virus protection system of claim 13 wherein the loading of the data window value plus the contents of the MFM counter is achieved by loading a data window value of at least one active binary bit without affecting the MFM counter bits of less significance than the data window value active binary bit.

15. The virus protection system of claim 13 wherein the at least one MFM counter that upon receiving a plurality of match event signals within one characteristic data time is loaded with a sum of the plurality of data window values associated with each match event signal plus the MFM counter contents and the MFM counter contents are shifted right one bit position upon receiving the shift signal from the data unit counter.

16. A network integrated protection adapter comprising:

a virus parameter storage storing selected host processor opcodes, patterns of opcode usage, and selected fading memory parameters that govern how memory of a match event fades over time; and a virus protection engine having a network interface for receiving a data stream, wherein the virus protection engine identifies host processor opcodes in the received data stream as match events and estimates a concentration of the selected host processor opcodes in the received data stream according to the selected fading memory parameters.

17. The network integrated protection adapter of claim 16 wherein the match events include identified patterns of opcode usage.

18. The network integrated protection adapter of claim 16 further comprising:

a match event engine operative on the data stream for detecting the patterns of opcode usage and to generate a match event signal upon each detected pattern of opcode usage.

19. The network integrated protection adapter of claim 16 wherein the selected fading memory parameters include a match event data window value, a characteristic data time number, and a threshold value.

20. The network integrated protection adapter of claim 19 further comprising:

a match event engine operative on the data stream for detecting the host processor opcodes to generate a match event signal upon each detected host processor opcode;

a data unit counter that repeatedly counts the characteristic data time number of incoming data units in the data stream and generates a data time indication when the data unit counter reaches the characteristic data time number, wherein the data unit counter rolls over after reaching the characteristic data time number;

at least one match fading memory (MFM) counter that upon receiving the match event signal is loaded with the match event data window value plus the MFM counter contents and the MFM counter contents are reduced upon receiving the data time indication from the data unit counter; and an output of the MFM counter is compared to the threshold value generating a detection flag upon the threshold value being exceeded for determining a suspect data indicator.

* * * * *